United States Patent
Koblents et al.

(10) Patent No.: US 10,540,194 B2
(45) Date of Patent: Jan. 21, 2020

(54) RUNTIME GPU/CPU SELECTION

(71) Applicant: International Business Machines Corporation, Armonk, NY (US)

(72) Inventors: Gita Koblents, Markham (CA); Alon Shalev Housfater, Vaughan (CA); Kazuaki Ishizaki, Tokyo (JP); Akihiro Hayashi, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/851,395

(22) Filed: Dec. 21, 2017

(65) Prior Publication Data

US 2019/0196853 A1    Jun. 27, 2019

(51) Int. Cl.
*G06F 9/45* (2006.01)
*G06F 9/455* (2018.01)
*G06F 8/41* (2018.01)

(52) U.S. Cl.
CPC ........ *G06F 9/45525* (2013.01); *G06F 8/4441* (2013.01)

(58) Field of Classification Search
None
See application file for complete search history.

(56) References Cited

U.S. PATENT DOCUMENTS

| | | | |
|---|---|---|---|
| 9,275,430 B2 | 3/2016 | Bakalash | |
| 9,417,929 B2 | 8/2016 | Fonseca et al. | |
| 9,436,526 B2 | 9/2016 | Munshi et al. | |
| 9,582,848 B2 | 2/2017 | de Richebourg et al. | |
| 9,760,376 B1 | 9/2017 | Beguet et al. | |
| 2010/0030896 A1* | 2/2010 | Chandramouli | G06F 16/24568 709/224 |
| 2010/0306753 A1* | 12/2010 | Yi | G06F 8/4452 717/149 |
| 2012/0216012 A1* | 8/2012 | Vorbach | G06F 8/443 712/11 |

(Continued)

OTHER PUBLICATIONS

Title: A dynamic self scheduling scheme, author: Mehmet E. Belviranli et al, source: ACM publishes on Jan. 2013.*

(Continued)

*Primary Examiner* — Chameli Das
(74) *Attorney, Agent, or Firm* — Heslin Rothenberg Farley & Mesiti P.C.; William Hartwell, Esq.

(57) ABSTRACT

A method, computer program product, and system includes a processor(s) obtaining, during runtime, from a compiler, two versions of a data parallel loop for an operation. The host computing system comprises includes a CPU and a GPU is accessible to the host. The processor(s) online profiles the two versions by asynchronously executing the first version, in a profile mode, with the GPU and executing the second version, in the profile mode, with the CPU. The processor(s) generates execution times for the first version and the second version. The processor(s) stores the executions times and performance data in a storage, where the performance data comprises a size of the data parallel loop for the operation. The processor(s) update a regression model(s) to predict performance numbers for a process of an unknown loop size. The processor(s) execute the operation with the CPU or the GPU based on the performance data.

14 Claims, 7 Drawing Sheets

(56) References Cited

U.S. PATENT DOCUMENTS

| | | | | |
|---|---|---|---|---|
| 2014/0026111 | A1* | 1/2014 | Stitt | G06F 9/4484 717/101 |
| 2014/0125683 | A1* | 5/2014 | Howard | G06T 1/20 345/505 |
| 2014/0181807 | A1* | 6/2014 | Fonseca | G06F 9/5083 718/1 |
| 2014/0201746 | A1* | 7/2014 | Munshi | G06F 8/41 718/100 |
| 2015/0186120 | A1* | 7/2015 | Mizrachi | G06F 8/41 717/140 |
| 2015/0277877 | A1* | 10/2015 | Feng | G06F 8/443 717/155 |
| 2015/0278850 | A1* | 10/2015 | Chatterjee | G06Q 30/0244 705/14.43 |
| 2015/0278962 | A1* | 10/2015 | Agarwal | G06Q 30/0244 705/7.39 |
| 2015/0317563 | A1* | 11/2015 | Baldini Soares | G06N 20/00 706/12 |
| 2015/0339570 | A1* | 11/2015 | Scheffler | G06N 3/10 706/16 |
| 2016/0232036 | A1* | 8/2016 | Zhu | H04L 67/303 |
| 2016/0259824 | A1* | 9/2016 | Livshits | G06F 16/2453 |
| 2017/0024849 | A1 | 1/2017 | Liu et al. | |
| 2018/0113729 | A1* | 4/2018 | Reinecke | G06F 8/4441 |
| 2018/0157471 | A1* | 6/2018 | Venkataramani | G06F 8/445 |
| 2018/0232916 | A1* | 8/2018 | Balmin | G06T 11/206 |
| 2018/0307310 | A1* | 10/2018 | McCombe | H04N 13/239 |
| 2018/0321347 | A1* | 11/2018 | Wang | G01R 33/5608 |

OTHER PUBLICATIONS

Title: High Performance Convolutional Neural Networks, author: K. Chellapilla et al: published on 2006.*

Title: Scalabel parallel programming, author: J. Nickolls et al; published on 2008.*

Title: A dynamic self-scheduling scheme for heterogeneous multi-processor architectures, author: ME Belviranli et al, pubslished on 2013.*

Mell et al., "The NIST Definition of Cloud Computing", National Institute of Standards and Technology, U.S. Dept. of Commerce, NIST Special Publ. 800-145, Sep. 2011, 7 pages.

Younghwan Oh et al., "Automatic Runtime Selection of Best Hardware for Data-Parallel JavaScript Kernels via Lifelong Profiling", http://prism.sejong.ac.kr/download/PRISM2_downlad/5_YounghwanOh_paper.pdf, 2 pages.

Wen et al., "Merge or Separate? Multi-job Scheduling for OpenCL Kernels on CPU/GPU Platforms", Th University of Edinburgh, Edinburgh Research Explorer, Download date Mar. 31, 2017, 11 pages.

Dollinger et al., Proceeding: "Adaptive Runtime Selection for GPU", IEEE Computer Society Washington, DC Oct. 1-4, 2013 http://dl.acm.org/citation.cfm?id=2571009&preflayout=tabs, 1 page.

Helal et al., Automatch: Automated Matching of Computer Kernels to Heterogeneous HPC Architectures, 11 pages. https://vtechworks.lib.vt.edu/bitstream/handle/10919/73693/AutoMatch.pdf?sequence=1.

* cited by examiner

RUNTIME GPU/CPU SELECTION

BACKGROUND

A graphics processing unit (GPU) (also referred to as a general purpose graphics processing unit) is a specialized electronic circuit designed to manipulate and alter memory rapidly in order to accelerate the creation of images in a frame buffer intended for output to a display device as well as for general purpose programming. GPUs are more efficient than general-purpose central processing units (CPUs) for algorithms, where the processing of large blocks of data is done in parallel. By off-loading data of parallel applications to either integrated or stand-alone GPUs, computer systems can process at an accelerated pace that can be orders of magnitude faster than utilizing CPUs alone.

SUMMARY

Shortcomings of the prior art are overcome and additional advantages are provided through the provision of a method for automatically determining whether executing an operation with a central processing unit or a graphics processing unit is faster. The method includes, for instance: obtaining, by one or more processors, during runtime, from a compiler, two versions of a data parallel loop for an operation, wherein a first version of the two versions is for execution of the operation with a graphics processing unit and a second version of the two versions is utilized to execute the operation with a central processing unit, where the host computing system comprises the central processing unit and the graphics processing unit is accessible to the host; online profiling the two versions by asynchronously executing the first version, in a profile mode, with the graphics processing unit and executing the second version, in the profile mode, with the central processing unit; generating, by the one or more processors, execution times for the first version and the second version; storing, by the one or more processors, the executions times and performance data from the online profile in a storage, wherein the performance data comprises a size of the data parallel loop for the operation; updating, by the one or more processors, one or more regression models to predict performance numbers for a process of an unknown loop size; and executing the operation by the central processing unit or the graphics processing unit based on the performance data.

Shortcomings of the prior art are overcome and additional advantages are provided through the provision of a computer program product for automatically determining whether executing an operation with a central processing unit or a graphics processing unit is faster. The computer program product comprises a storage medium readable by a processing circuit and storing instructions for execution by the processing circuit for performing a method. The method includes, for instance: obtaining, by the one or more processors, during runtime, from a compiler, two versions of a data parallel loop for an operation, wherein a first version of the two versions is for execution of the operation with a graphics processing unit and a second version of the two versions is utilized to execute the operation with a central processing unit, where the host computing system comprises the central processing unit and the graphics processing unit is accessible to the host; online profiling the two versions by asynchronously executing the first version, in a profile mode, with the graphics processing unit and executing the second version, in the profile mode, with the central processing unit; generating, by the one or more processors, execution times for the first version and the second version; storing, by the one or more processors, the executions times and performance data from the online profile in a storage, wherein the performance data comprises a size of the data parallel loop for the operation; updating, by the one or more processors, one or more regression models to predict performance numbers for a process of an unknown loop size; and executing the operation by the central processing unit or the graphics processing unit based on the performance data.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
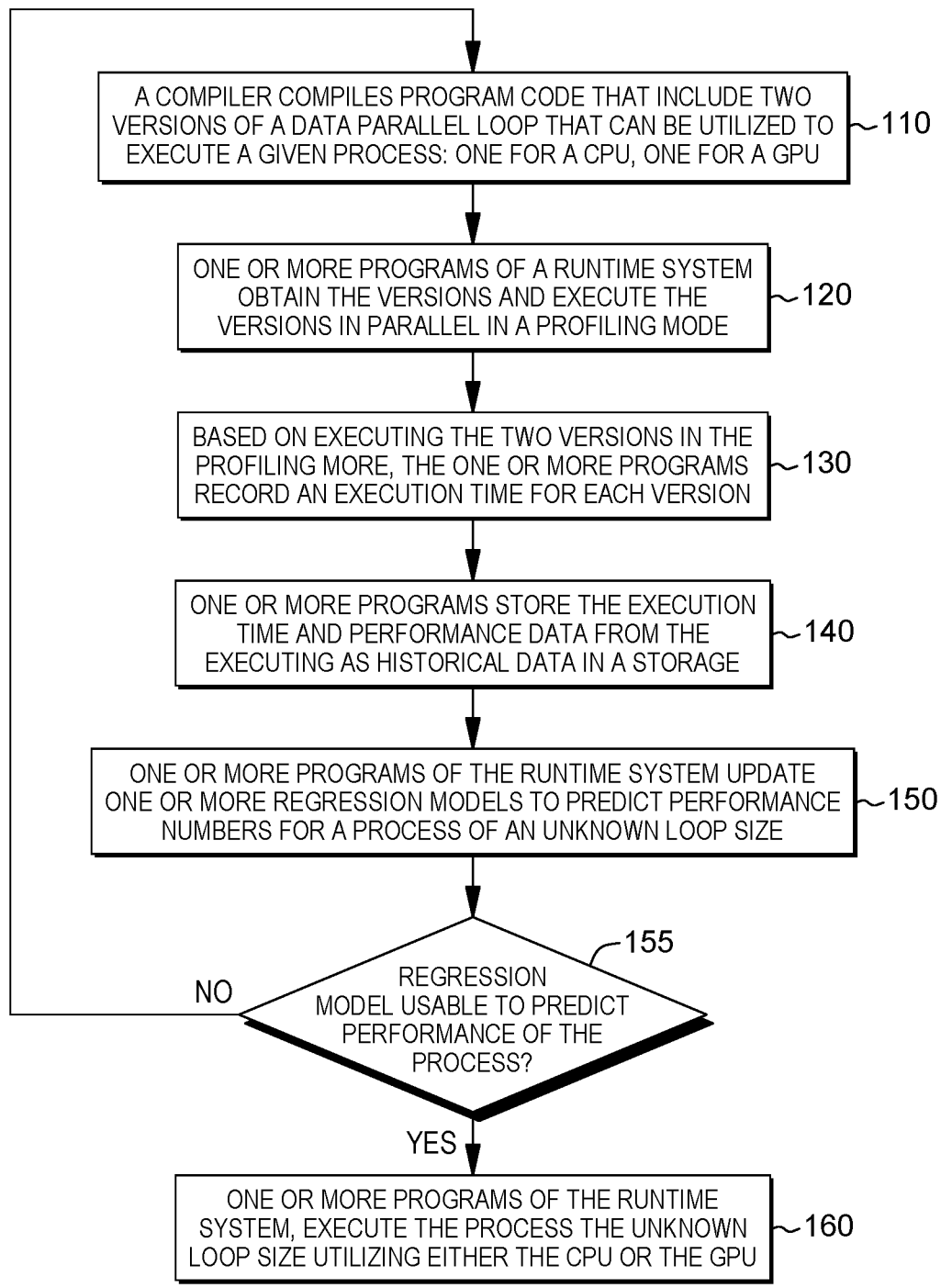
FIG. 1 is a workflow illustrating certain aspects of an embodiment of the present invention.

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
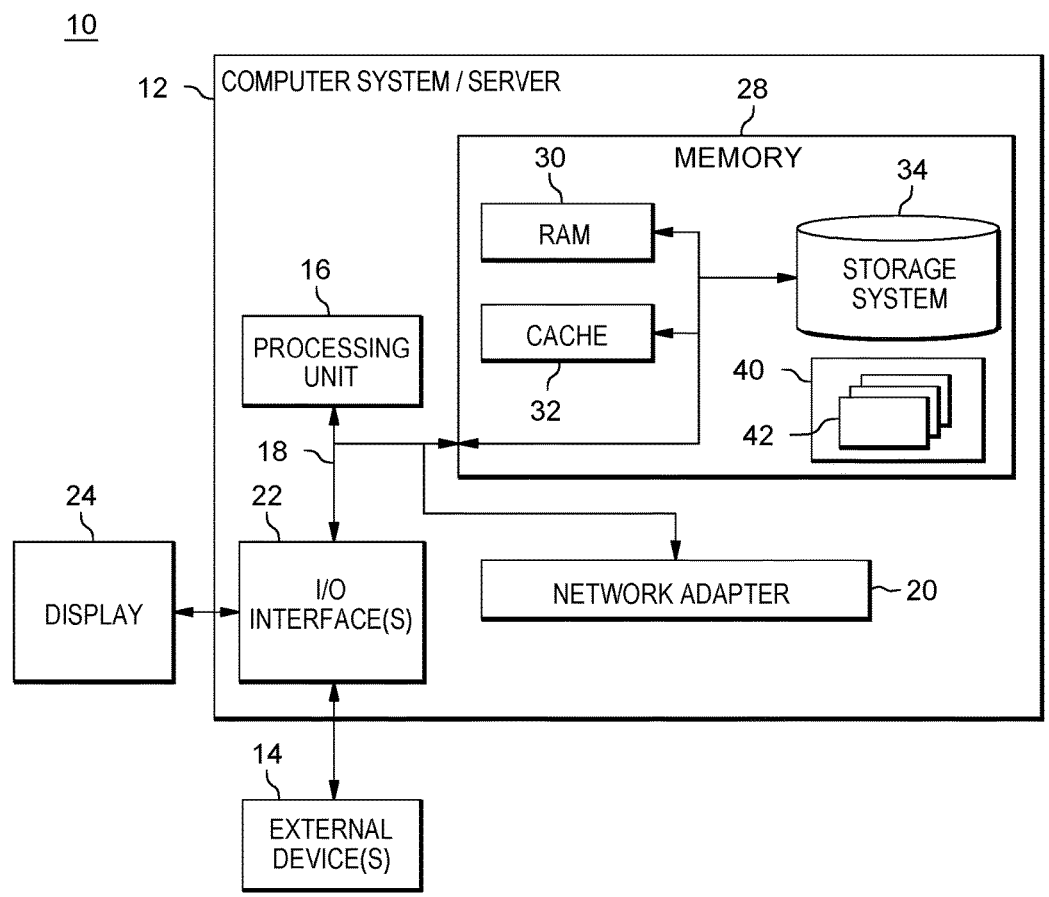
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Although utilizing GPUs (graphics processing units, including general purpose graphics processing units) can accelerate processing, the process of designating tasks for processing by the GPU, in order to achieve this increased processing speed, can be work intensive and/or manual. One issue in realizing the full benefit that GPUs can provide to processing efficiency is that the low level application programming interfaces (APIs) provided for the general purpose programming of GPUs leave many non-trivial tasks to the programmers.

One of such tasks is deciding which program will benefit from GPU. The high GPU throughput is achieved by combining thousands of relatively basic processes that execute uniform operations in parallel. Not every program can benefit from this mode of execution. For example, the presence of branches can cause branch diversion issues on GPU that can negatively affect performance and an incorrect decision can either cause a considerable performance degradation or miss on a high speed-up opportunity.

Embodiments of the present invention include a computer-implemented method, a computer program product, and a computer system that include one or more programs that make runtime selections between a central processing unit and a graphic processing unit. Embodiments of the present invention include one or more programs that automatically profile processes, in order to effectively determine which processes would be efficiently executed by a GPU and/or a CPU. In addition to featuring automatic profiling (that is unavailable in existing systems), some embodiments of the present invention may include additional improvements over existing methods of determining which programs should be executed by a GPU. First, in embodiments of the present invention, one or more programs perform online profiling that increase accuracy of predictions (regarding which programs would benefit from being executed by a GPU) by collecting data for each GPU kernel individually. Collecting data separately increased the accuracy of prediction because the only variable for each kernel is the size and the content of the input data on which it operates. Second, in embodiments of the present invention, one or more programs utilize the data from the profiling and machine learning algorithms to generate an empirical cost model. Third, the one or more programs may perform the aforementioned profiling asynchronously, which introduces minimal overhead. Certain existing systems require synchronization and constant load re-balancing between GPU and CPU, which required considerable overhead. In contrast, in embodiments of the present invention, one or more programs synchronously determine a best time (CPU or GPU) after both executions have completed and use this result as a training data for predicting results for the subsequent runs. Unlike certain existing technologies, in order to execute prediction asynchronously and quickly, the one or more program perform profiling without data being transferred to GPU. Rather, in some embodiments of the present invention, one or more programs perform a sanity check to ensure that using non-initialized data will not cause any abnormal results on GPU. The one or more programs proceed to profile kernels that pass this check. Fourth, the cost of the data transfer and kernel launch is predicted analytically based on a linear model. Data transfers that are performed to execute GPU kernels, in existing approaches, introduce overhead, which is avoided using this approach. Fifth, aspects of certain embodiment of the present invention are extendable to allow for future improvements, including implementing a scheme where a device that finishes first interrupts a slower device and results from the faster device are used, while results from the slower device are discarded. These improvements are inextricably tied to computing as the distribution of processes at runtime to a GPU or a CPU impacts the efficiency of processing within a computing system as a while.

Embodiments of the present invention include one or more programs of a runtime system that profile and store performance data of programs, when executed separately by both a CPU and a GPU, utilizing low overhead, and predict whether to use the CPU or the GPU to execute the program more quickly. Upon making the selection, the one or more programs of the runtime system proceed to execute the program with the processing unit the one or more programs predicted to be faster. Thus, in embodiments of the present invention, before executing a program, the one or more programs of the runtime system, will profile the program, and then, execute the program.

FIG. 1 is a workflow 100 that includes an overview of various aspects of some embodiments of the present invention. In embodiments of the present invention, one or more programs of the runtime select the faster processing unit for executing a process, a CPU or a GPU. The one or more programs of the runtime system are part of the collection of software and hardware resources that enable a software program to be executed on the computer system. The one or more programs in the runtime system provide program execution services.

FIG. 1 depicts both runtime modes executed by one or more programs of the runtime system: 1) profiling; and 2) executing. In an embodiment of the present invention, a compiler (e.g., a just-in-time (JIT) compiler) compiles program code that includes two versions of a data parallel loop that can be utilized to execute a given process: one for a CPU, one for a GPU (110). One or more programs of a runtime system obtain the versions and execute the versions in parallel in a profiling mode (120). Based on executing the two versions in the profiling mode, the one or more programs record an execution time for each version (130). The one or more programs store the execution time and performance data from the executing as historical data in a storage (140). The performance may include an identifier (ID) of a kernel, a size of the parallel loop, a mean and a standard deviation of the execution time related to the CPU and the GPU times. The one or more programs of the runtime system update one or more regression models to predict performance numbers for a process of an unknown loop size (150). Based on continuously updating the regression models (155), the one or more programs interpolate the historical data using an online machine learning algorithm and determine whether to use the CPU or the GPU to execute the process of the unknown loop size (160). Based on the determination, in execution mode, the one or more programs of the runtime system, execute the process the unknown loop size utilizing either the CPU or the GPU (170).

Figure 2:
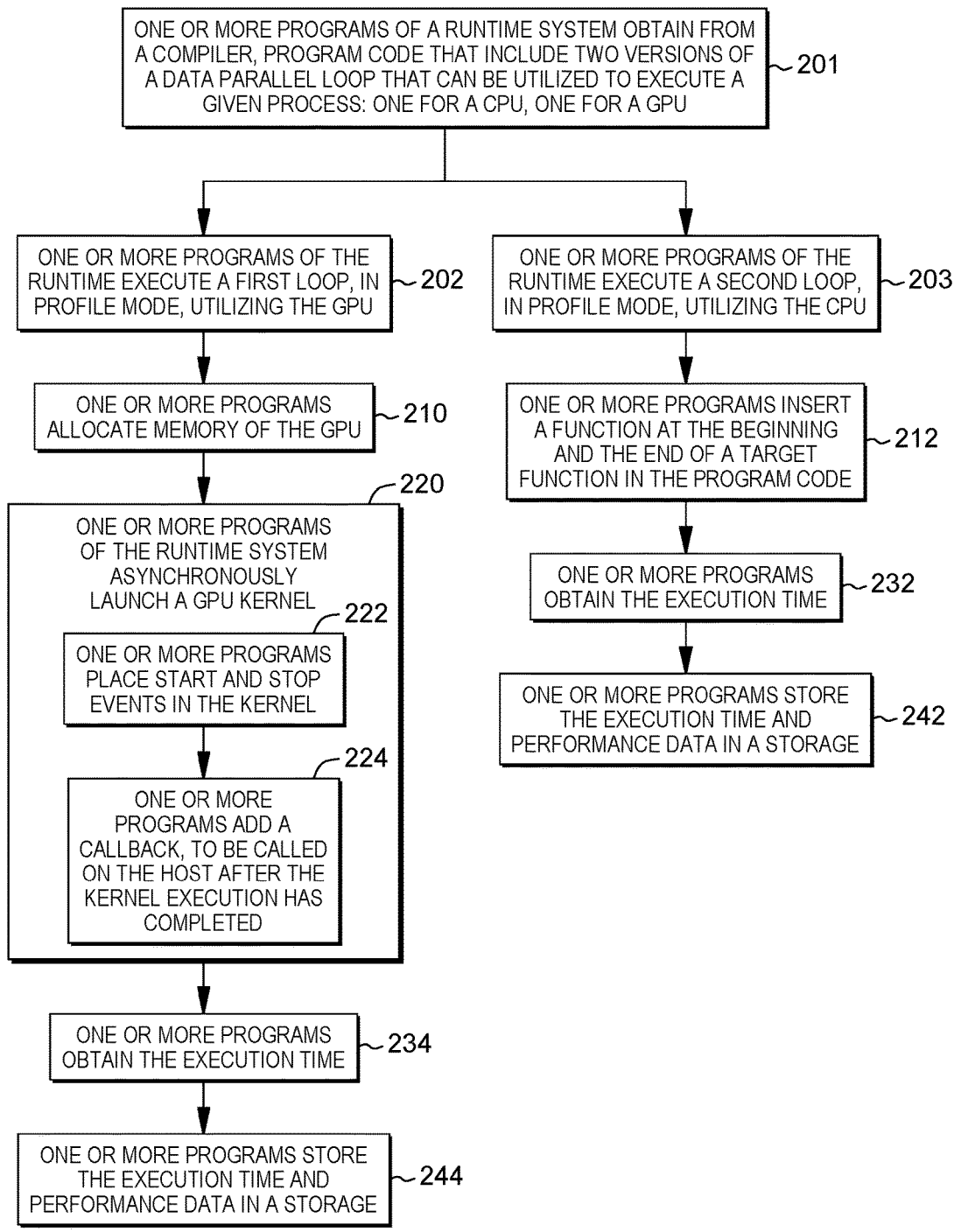
FIG. 2 is a workflow illustrating certain aspects of an embodiment of the present invention.

FIG. 2 is a workflow 200 that illustrates aspects of the profiling mode illustrated in FIG. 1 (e.g., 120-155). As aforementioned, one or more programs of the runtime system profile a process, online, to ultimately determine whether the process is more efficiently executed by a CPU or by a GPU. Upon obtaining the two versions of the data parallel loop from the compiler (201), the one or more programs of the runtime execute, in parallel, a first loop in profile mode utilizing the GPU (202) and a second loop in profile mode utilizing the CPU (203). Despite profiling the GPU and the CPU in parallel, the one or more programs perform this (online) profiling asynchronously. In some embodiments of the present invention, a version is executed by the GPU asynchronously, while the version executed by the CPU executes in the original thread.

To profile a process utilizing the GPU, the one or more programs allocate memory of the GPU (210). The one or more programs may not transfer data to the GPU during this process if it will not affect the execution time on the GPU. The one or more programs of the runtime system asynchronously launch a GPU kernel (220). The CPU version executes in the original thread, at least in our current implementation.

The one or more programs may utilize a stream (i.e., a sequence of operations that execute in issue-order on the GPU) to launch the GPU kernel. In some embodiments of the present invention, the one or more programs may utilize aspects of existing computing platforms and standards to launch a GPU kernel utilizing a stream. For example, one or more programs may utilize a CUDA stream or an OpenCL stream to launch the GPU kernel. CUDA is a parallel computing platform and API that enables use of a GPU for general purpose processing. The CUDA platform includes a software layer that provides programs, such as the one or more programs of the runtime system, in embodiments of the present invention, direct access to a GPU's virtual instruction set and parallel computational elements, for the execution of compute kernels. OpenCL is a framework for writing programs that execute across heterogeneous platforms consisting of both CPUs and GPU. The one or more programs of the runtime system manage asynchronousity by utilizing the (e.g., CUDA/OpenCL) stream, which is a sequence of commands that are performed in order on the GPU.

The one or more programs launch the GPU kernel (220), in a manner that does not block a host by placing certain elements in the GPU kernel. The one or more programs place start and stop events in the kernel (222) and the one or more programs add a callback, to be called on the host after the kernel execution has completed (224).

Aspects of various existing computing platforms and frameworks can be utilized to implement certain aspects of embodiments of the present invention. As a non-limiting example, aspects of both CUDA and OpenCL can be utilized in embodiments of the present invention in order to place start and stop events in the kernel (222) and to add a callback (224).

In some embodiments of the present invention, the start and stop events may be CUDA and/or OpenCL start and stop events. The CUDA/OpenCL event API includes calls to create and destroy events, record events, and compute the elapsed time in milliseconds between two recorded events. The one or more programs of the runtime system utilize CUDA/OpenCL events in the aforementioned CUDA/OpenCL stream (i.e., a sequence of operations that are performed in order on a device) the one or more programs utilize to launch the GPU kernel to monitor the GPU performance. The one or more programs place the start and stop events immediately before and after the kernel launch in the CUDA/OpenCL stream.

The one or more programs add a callback to the stream (224) so that the one or more programs can obtain, for the GPU-based execution in profile mode, the execution time for the relevant version (234; e.g., FIG. 1, 130). By utilizing the callback, the one or more programs of the runtime system (e.g., a main program thread) obtain the GPU elapsed time. Executing a callback in the stream serves to enqueue kernel ID and the start/stop events into the GPU timing queue, from which the one or more programs can obtain the GPU elapsed time. Thus, inserting a callback ultimately enables the one or more programs to store the execution time and performance data, from executing the relevant version in profile mode in the GPU, as historical data in a storage (244; e.g., FIG. 1, 140). In an embodiment of the present invention, the one or more programs add the callback to the stream (224) using a cudaStreamAddCallback( ) instruction. The CUDA API does not enable callbacks to make CUDA API calls. However, the cudaStreamAddCallback( ) instruction enables the callback to enqueue execution time and performance data (e.g., kernel ID and the start/stop events), into the GPU timing queue, so a main program thread can obtain the GPU elapsed time using a cudaEventElapsedTime( ) command. In an embodiment of the present invention that utilizes aspects of OpenCL, the one or more programs add the callback to the stream (224) using a clSetEventCallback( ) instruction.

Returning to FIG. 2, the one or more programs call the callback and the callback enqueues kernel ID, and the start and stop events to the GPU time queue (230). To minimize the profiling overhead the one or more programs of the runtime system do not communicate GPU results to the CPU.

The one or more programs of the runtime execute the second loop in profile mode utilizing the CPU (203). To profile execution of program code with the CPU, the one or more programs of the runtime system insert a function at the beginning and the end of a target function in the program code (212). For example, in an embodiment of the present invention, the one or more programs insert a gettimeofday( ) function, as the overhead for this function is smaller than CPU executions. Upon executing the gettimeofday( ) function, the one or more programs of the runtime obtain, for the CPU-based execution in profile mode, the execution time for the relevant version (232; e.g., FIG. 1, 130). The one or more programs store the execution time and performance data, from executing the relevant version in profile mode in the CPU, as historical data in a storage (242; e.g., FIG. 1, 140).

As illustrated in FIG. 1, based in the retained data from executing loops in a profiling mode in both the CPU and the GPU, the one or more programs of the runtime system update one or more regression models to predict performance numbers for a process of an unknown loop size (150). The continuous updating of the models enable the one or more programs of the runtime to learn about execution efficiencies within the system such that the one or more programs may reference the profiling data to predict whether a given operation would be executed more quickly by a CPU or by a GPU. Thus, for each kernel ID and parallel loop size, the one or more programs of the runtime system may select the GPU version as the faster version, only when the runtime is statistically confident with its selection.

The one or more programs determine whether the parallel loop size is previously executed or not. Whether or not the loop size has been executed, the one or more programs of the runtime estimate: 1) memory allocation overhead, 2) data transfer overhead (the device to the host and the host to the device), and 3) the kernel invocation overhead, to compute the overall GPU timings. In contrast to the execution time prediction (which device is faster), the one or more programs may construct these analytical performance models offline.

Figure 3:
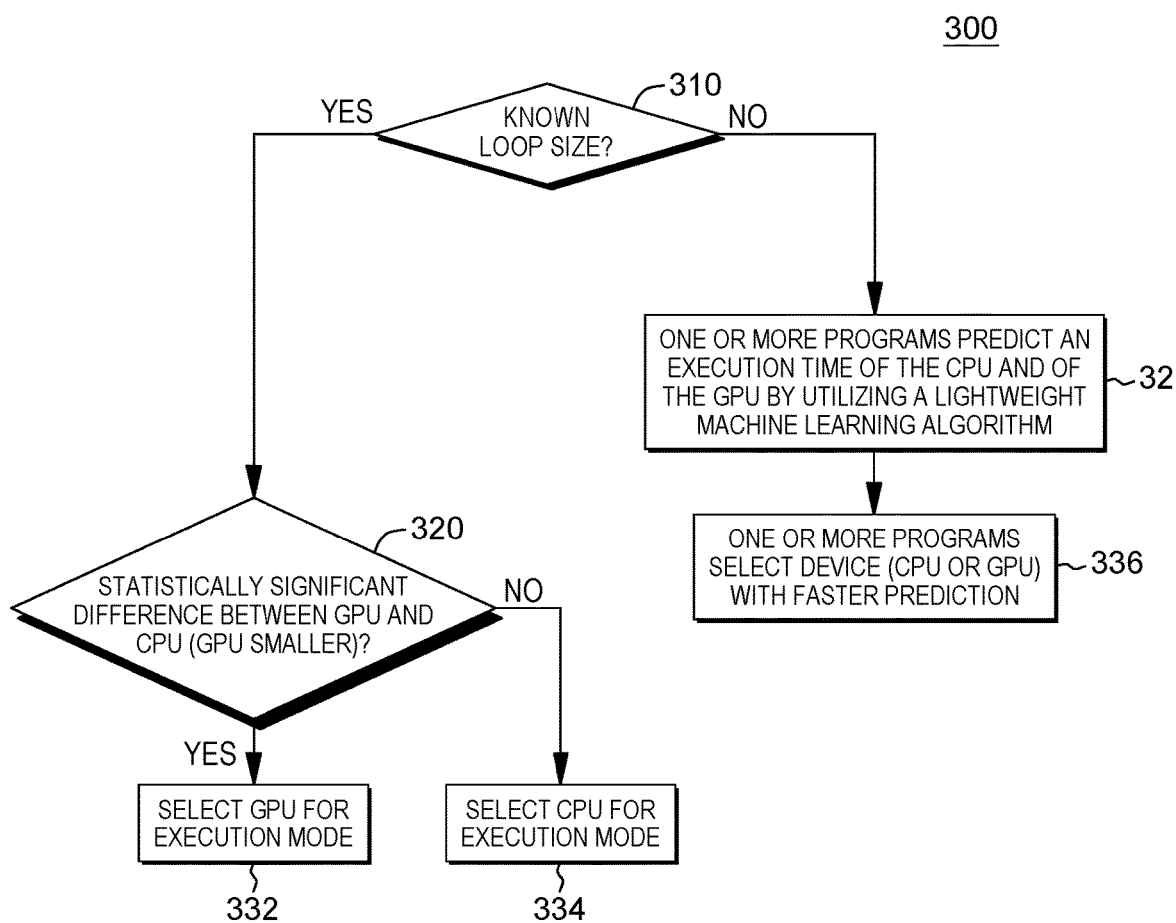
FIG. 3 is a workflow illustrating certain aspects of an embodiment of the present invention.

FIG. 3 is a workflow 300 that illustrates how one or more programs of the runtime system predict a faster device from the CPU and the GPU, whether the loop size is known or not. The one or more programs determine if a loop size is known, based on the historical data (310). Based on the loop size being known, the one or more programs determine whether there is a statistically significant difference between the CPU and the GPU profiling (320). In some embodiments, statistically significance is based on a pre-defined confidence level (e.g., computing a ninety-five (95) percent confidence interval for the mean of the CPU and the GPU time). The one or more programs may select the GPU when upper bounds of GPU's confidential interval plus the estimated GPU overhead (e.g., allocation, data transfer, and invocation overheads) is smaller than the lower bound of CPU's confidential interval. Based on finding a statistically significant difference with the GPU being smaller, the one or more programs select the GPU (332). Based on not finding a statistically significant difference with the GPU being smaller, the one or more programs select the CPU (334).

Based on the loop size not being known, the one or more programs of the runtime system predict an execution time of the CPU and of the GPU by utilizing a lightweight machine learning algorithm (322) and select the device with the faster prediction (336). The algorithm may be capable of updating a model incrementally, such as the kernel recursive least squares and the passive aggressive algorithm, to reduce the overhead of updating and referencing the model. In applying the algorithm, the one or more programs may utilize program information extracted by the compiler, including parallel loop size and a dynamic number of instructions in the compiler's intermediate language, which are correlated with the execution time.

Figure 4:
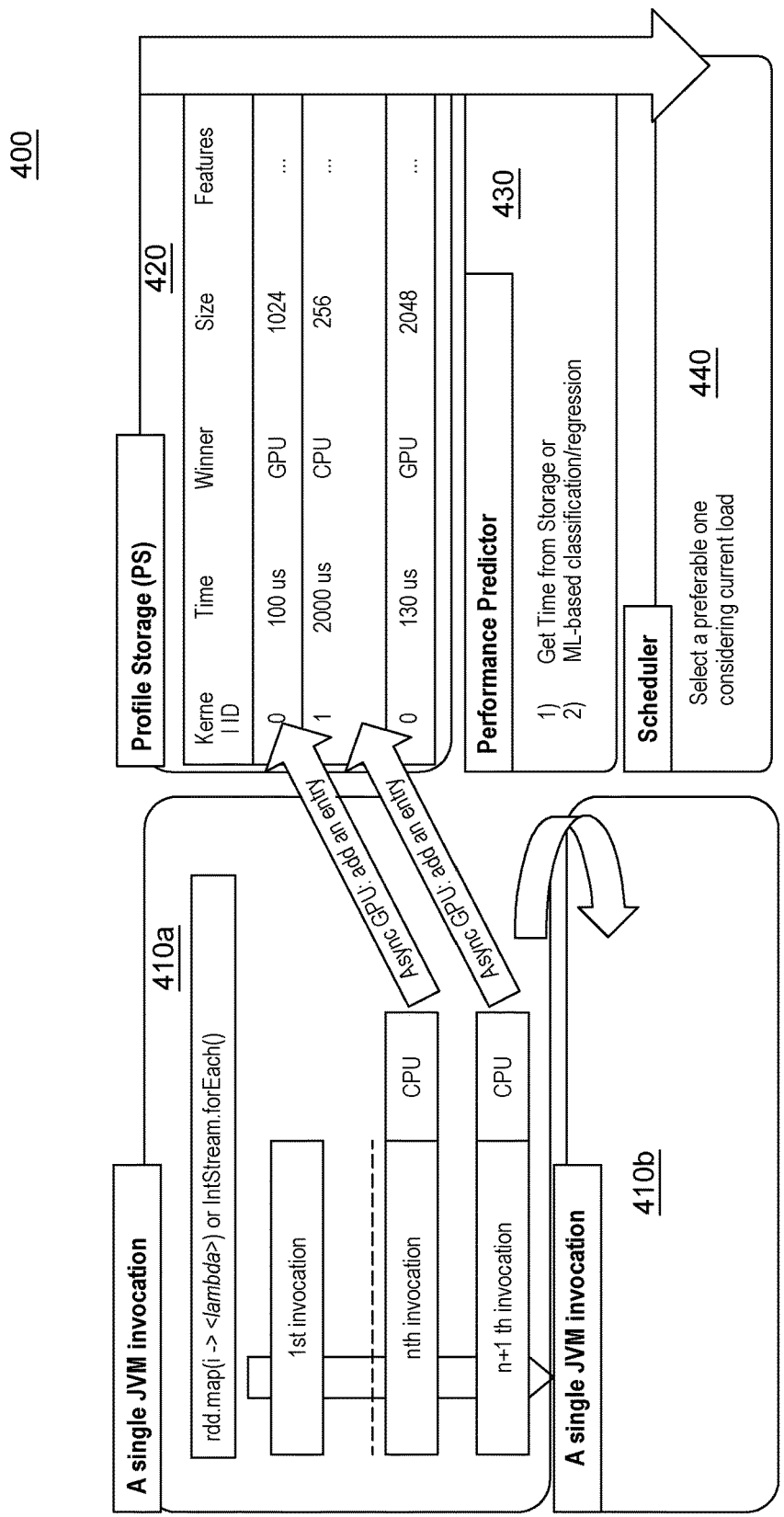
FIG. 4 is an illustration of certain aspects of a technical environment into which certain aspects of an embodiment of the present invention may be implemented.

FIG. 4 is an illustration 400 of certain aspects of some embodiments of the present invention and depicts one or more programs in a runtime system selecting a device (e.g., a CPU or a GPU) to execute a method, depending on which device the one or more programs predict will execute the method faster. In an embodiment of the present invention, the one or more programs of the runtime system select a device for execution of each method invoked by a virtual machine (e.g., a Java virtual machine). Depicted is a first method invoked by a virtual machine 410a, which is followed by a second method invoked by a virtual machine 410b, which will follow the illustrated process. The one or more programs profile each operation in the method in a CPU and asynchronously in a GPU (see, e.g., FIG. 2). The one or more programs retain historical data related to profiling each operation in both the CPU and the GPU in a profiling storage 420. For each kernel, the one or more programs retain a kernel ID, the time predicted for execution, based on the profiling, the size of the loop of the operation, and whether the CPU or the GPU was profiled to be faster. The one or more programs utilize at least one machine learning algorithm to update regression models to determine correlations between loop size and device, so that, going forward, the one or more programs may select the faster device for a loop of a size that was not previously profiled by the one or more programs. Thus, the one or more programs predict performance of a given operation 430 by checking the profiling storage to see if there is available data regarding a loop of the same size as a the given operation. If there is an entry for the size of the given operation, the one or more programs select the device based on this entry. If there is no entry for the size of the given operation, the one or more programs apply one or more machine-learning based classification/regression models to select the device. One the one or more programs have selected a device, based on kernel, time, and size, the one or more programs schedule 440 execution of the operation.

Embodiments of the present invention include a computer-implemented method, a computer program product and a computer system where one or more programs obtain, during runtime, from a compiler two versions of a data parallel loop for an operation, where a first version of the two versions is for execution of the operation with a graphics processing unit and a second version of the two versions is utilized to execute the operation with a central processing unit, where a host computing system includes the central processing unit and the graphics processing unit is accessible to the host. The one or more programs online profile the two versions by asynchronously executing the first version, in a profile mode, with the graphics processing unit and executing the second version, in the profile mode, with the central processing unit. The one or more programs generate execution times for the first version and the second version. The one or more programs store the executions times and performance data from the online profile in a storage, wherein the performance data comprises a size of the data parallel loop for the operation. The one or more programs update one or more regression models to predict performance numbers for a process of an unknown loop size. The one or more programs executing the operation by the central processing unit or the graphics processing unit, based on the performance data.

In some embodiments of the present invention, the one or more programs obtain, during runtime, from the compiler, two versions of a second data parallel loop for a second operation. The one or more programs determine, based on accessing the storage, if a size of the second data parallel loop for the second operation is equivalent to the size of the data parallel loop for the operation. Based on determining that the size of the second data parallel loop is equivalent to the size of the data parallel loop, the one or more programs execute the second operation with a device utilized to execute the operation, where the device is selected from the group consisting of: the central processing unit and the graphics processing unit.

In some embodiments of the present invention, the one or more programs obtain, during runtime, from the compiler, two versions of a second data parallel loop for a second operation. The one or more programs determine, based on accessing the storage, if a size of the second data parallel loop for the second operation is equivalent to the size of the data parallel loop for the operation. Based on determining that the size of the second data parallel loop is not equivalent to the size of the data parallel loop, the one or more programs apply the one or more regression models to predict a first performance number for the second operation, when executed by the central processing unit, and second performance number for the second operation, when executed by the graphics processing unit. The one or more programs select, from the first performance number and the select performance number, a faster performance number. The one or more programs execute the second operation with a device associated with the faster performance number, where the device is selected from the group consisting of: the central processing unit and the graphics processing unit.

In some embodiments of the present invention, the one or more programs online profile the two versions by asynchronously executing the first version, in a profile mode, with the graphics processing unit and executing the second version, in the profile mode, with the central processing unit, by performing a sanity check to determine if utilizing non-initialized data will not cause abnormal results on the graphics processing unit. The one or more programs profile, individually, graphics processing unit kernels passing the sanity check.

In some embodiments of the present invention, the one or more programs online profile the two versions by asynchronously executing the first version, in a profile mode, with the graphics processing unit and executing the second version, in the profile mode, with the central processing unit, by asynchronously executing the first version with the graphics processing unit in the profile mode. The one or more programs asynchronously execute by allocating memory of the graphics processing unit. The one or more programs launch a graphics unit processing kernel to execute the first version, by populating the kernel with start and stop events, adding a callback to be called on the host after the kernel execution is complete, and executing the first version with the kernel.

In some embodiments of the present invention, the one or more programs generate the execution time for the first version. As such, the one or more programs executed the callback, where the executing enqueues a kernel identifier for the kernel and the start and stop events into a graphics processing unit queue. The one or more programs obtain the kernel identifier and the start and stop events from the graphics processing unit queue, where the kernel identifier and the start and stop events comprise a portion of execution time and the performance data for the operation when executed by the graphics processing unit. The start and stop events and the callback may prevent the kernel from blocking the host.

In some embodiments of the present invention, the one or more programs utilize a stream in launching the graphics unit processing kernel, where the stream includes a command to launch the kernel. The stream may be a CUDA stream or an OpenCL stream.

In some embodiments of the present invention, the one or more programs populate the kernel with the start and stop events by placing the start event immediately before the command to launch the kernel in the stream and placing the stop event immediately after the command to launch the kernel in the stream.

In some embodiments of the present invention, the one or more programs online profile the two versions by asynchronously executing the first version, in a profile mode, with the graphics processing unit and executing the second version, in the profile mode, with the central processing unit, by executing the second version with the central processing unit, in the profile mode, by inserting a function at a beginning and an end of the operation in the program code and executing the second version with the central processing unit.

In some embodiments of the present invention, the one or more programs obtain during runtime, from the compiler, two versions of a second data parallel loop for a second operation. The one or more programs determine, based on accessing the storage, if a size of the second data parallel loop for the second operation is equivalent to the size of the data parallel loop for the operation. Based on determining that the size of the second data parallel loop is equivalent to the size of the data parallel loop, the one or more programs determine whether there is a difference between the execution time from profiling the central processing unit and the execution time from profiling the graphics processing unit is statistically significant. Based on determining the difference is statistically significant, the one or more programs execute the second operation with the graphics processing unit. Based on determining the difference is not statistically significant, the one or more programs execute the second operation with the central processing unit. In some embodiments of the present invention, the difference is statistically significant at a ninety-five (95) percent confidence interval between a mean of the execution time for the graphics processing unit and a mean of the execution time for the central processing unit.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resource(s) that includes a CPU and/or a GPU can be understood as part of one or more cloud computing nodes 10 (FIG. 5) and if not examples of portions of a cloud computing node 10, then a portion of one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
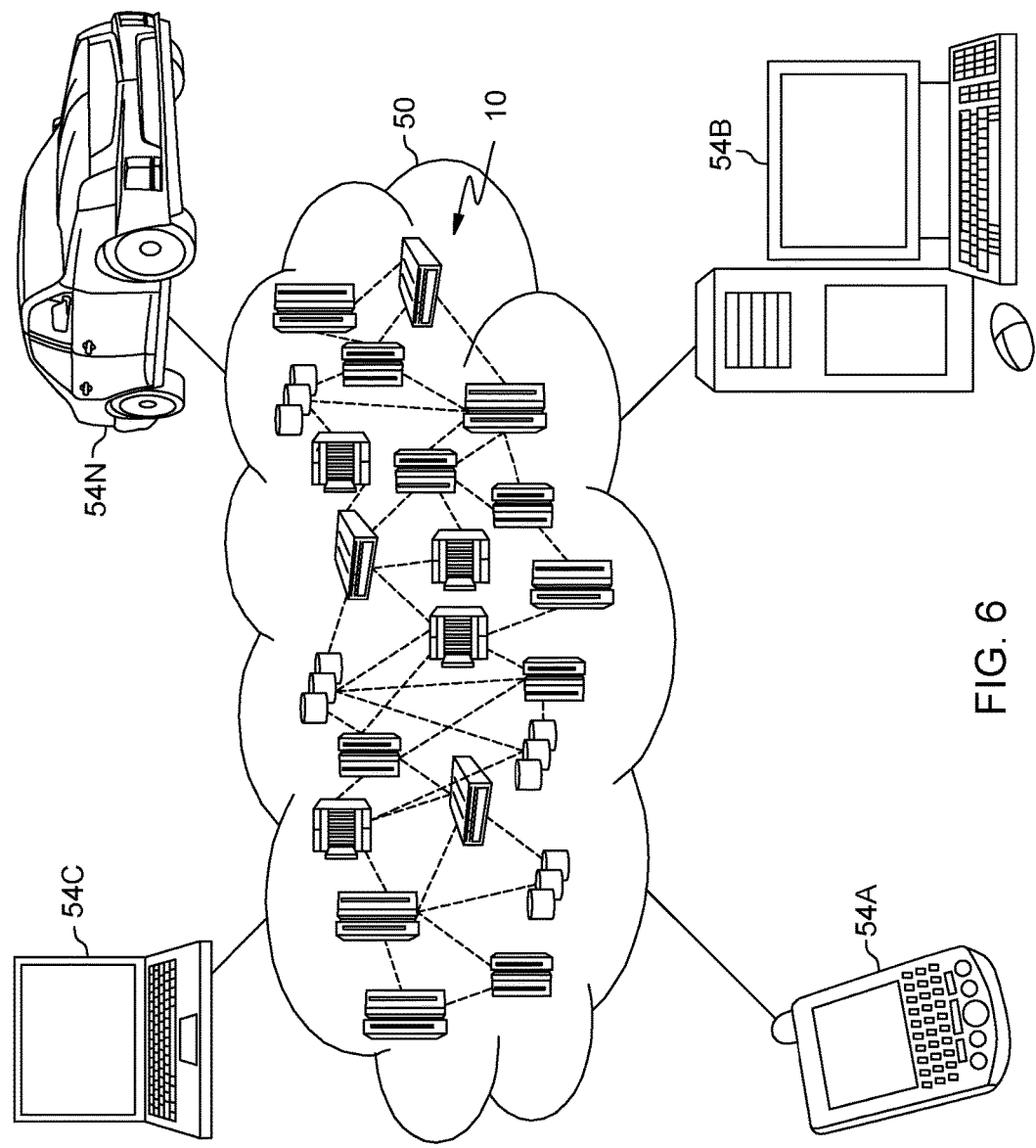
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
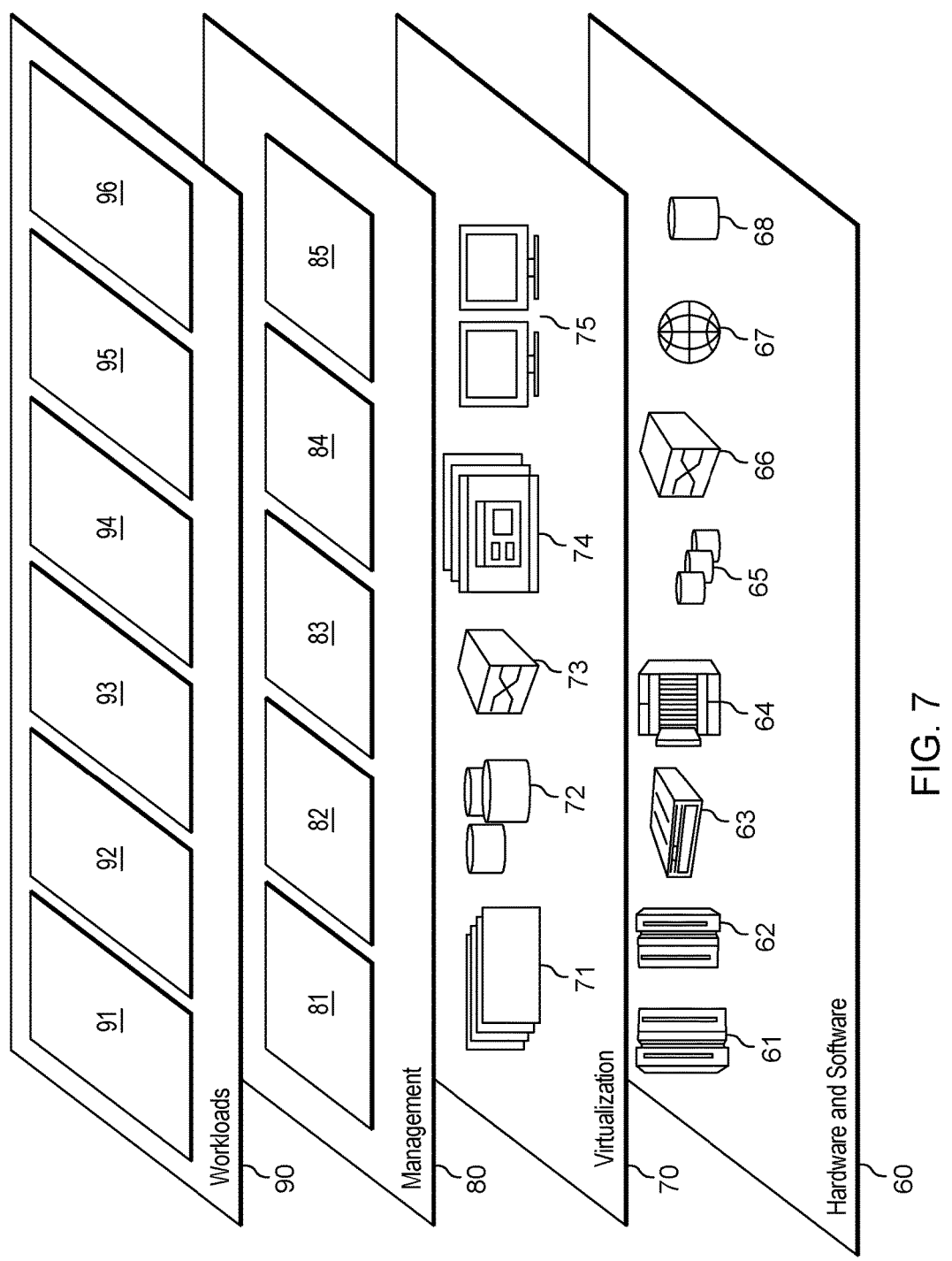
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selecting a device for execution of instructions 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:
1. A computer-implemented method, comprising:
obtaining, by one or more processors, during runtime, from a compiler two versions of a data parallel loop for an operation, wherein a first version of the two versions is for execution of the operation with a graphics processing unit and a second version of the two versions is utilized to execute the operation with a central processing unit, wherein a host computing system comprises the central processing unit and the graphics processing unit is accessible to the host;
online profiling the two versions by asynchronously executing the first version, in a profile mode, with the graphics processing unit and executing the second version, in the profile mode, with the central processing unit;
generating, based on the online profiling, by the one or more processors, execution times for the first version and the second version to determine whether to utilize the graphics processing unit or the central processing unit to execute the operation more quickly;
storing, by the one or more processors, the executions times and performance data from the online profile in a storage, wherein the performance data comprises a size of the data parallel loop for the operation;
updating, by the one or more processors, one or more regression models to predict performance numbers for a process of an unknown loop size;

executing the operation by one of the central processing unit or the graphics processing unit based on the performance data;

obtaining, by one or more processors, during runtime, from the compiler, two versions of a second data parallel loop for a second operation;

determining, by the one or more processors, based on accessing the storage, if a size of the second data parallel loop for the second operation is equivalent to the size of the data parallel loop for the operation;

based on determining that the size of the second data parallel loop is not equivalent to the size of the data parallel loop, applying the one or more regression models to predict a first performance number for the second operation, when executed by the central processing unit, and second performance number for the second operation, when executed by the graphics processing unit;

selecting, from the first performance number and the second performance number, a faster performance number; and executing the second operation with a device associated with the faster performance number to execute the second operation more quickly than without the faster performance number, wherein the device is selected from the group consisting of: the central processing unit and the graphics processing unit.

2. The computer-implemented method of claim 1, wherein online profiling the two versions of the data parallel loop for an operation by asynchronously executing the first version of the two versions of the data parallel loop for the operation, in a profile mode, with the graphics processing unit and executing the second version of the two versions of the data parallel loop for the operation, in the profile mode, with the central processing unit, comprises:

performing, by the one or more processors, a sanity check to determine if utilizing non-initialized data will not cause abnormal results on the graphics processing unit; and profiling, by the one or more processors, individually, graphics processing unit kernels passing the sanity check.

3. The computer-implemented method of claim 1, wherein online profiling the two versions of the data parallel loop for the operation by asynchronously executing the first version of the two versions of the data parallel loop for the operation, in a profile mode, with the graphics processing unit and executing the second version of the two versions of the data parallel loop for the operation, in the profile mode, with the central processing unit, comprises:

asynchronously executing, by the one or more processors, the first version of the two versions of the data parallel loop for the operation with the graphics processing unit in the profile mode, comprising:

allocating memory of the graphics processing unit;

launching a graphics unit processing kernel to execute the first version of the two versions of the data parallel loop for the operation, wherein the launching comprises:

populating the kernel with start and stop events;

adding a callback to be called on the host after the kernel execution is complete; and executing the first version of the two versions of the data parallel loop for the operation with the kernel.

4. The computer-implemented method of claim 3, wherein generating the execution time for the first version of the two versions of the data parallel loop for the operation comprises:

executing the callback, wherein the executing enqueues a kernel identifier for the kernel and the start and stop events into a graphics processing unit queue; and obtaining, by the one or more processors, the kernel identifier and the start and stop events from the graphics processing unit queue, wherein the kernel identifier and the start and stop events comprise a portion of execution time and the performance data for the operation when executed by the graphics processing unit.

5. The computer-implemented method of claim 3, wherein the start and stop events and the callback prevent the kernel from blocking the host.

6. The computer-implemented method of claim 3, further comprising utilizing a stream in launching the graphics unit processing kernel, wherein the stream comprises a command to launch the kernel.

7. The computer-implemented method of claim 6, wherein the stream is selected from the group consisting of: a CUDA stream and an OpenCL stream.

8. The computer-implemented method of claim 6, wherein populating the kernel with the start and stop events comprises placing the start event immediately before the command to launch the kernel in the stream and placing the stop event immediately after the command to launch the kernel in the stream.

9. The computer-implemented method of claim 1, wherein online profiling the two versions of the data parallel loop for the operation by asynchronously executing the first version of the two versions of the data parallel loop for the operation, in a profile mode, with the graphics processing unit and executing the second version of the two versions of the data parallel loop for the operation, in the profile mode, with the central processing unit, comprises:

executing, by the one or more processors, the second version of the two versions of the data parallel loop for the operation with the central processing unit, in the profile mode, comprising:

inserting, by the one or more programs, a function at a beginning and an end of the operation in the program code; and executing the second version of the two versions of the data parallel loop for the operation with the central processing unit.

10. A computer program product comprising:

a computer readable storage medium readable by one or more processors and storing instructions for execution by the one or more processors for performing a method comprising:

obtaining, by the one or more processors, during runtime, from a compiler two versions of a data parallel loop for an operation, wherein a first version of the two versions is for execution of the operation with a graphics processing unit and a second version of the two versions is utilized to execute the operation with a central processing unit, wherein a host computing system comprises the central processing unit and the graphics processing unit is accessible to the host;

online profiling the two versions by asynchronously executing the first version, in a profile mode, with the graphics processing unit and executing the second version, in the profile mode, with the central processing unit;

generating, based on the online profiling, by the one or more processors, execution times for the first version and the second version to determine whether to utilize the graphics processing unit or the central processing unit to execute the operation more quickly;

storing, by the one or more processors, the executions times and performance data from the online profile in a storage, wherein the performance data comprises a size of the data parallel loop for the operation;

updating, by the one or more processors, one or more regression models to predict performance numbers for a process of an unknown loop size;

executing the operation by the central processing unit or the graphics processing unit based on the performance data;

obtaining, by one or more processors, during runtime, from the compiler, two versions of a second data parallel loop for a second operation; determining, by the one or more processors, based on accessing the storage, if a size of the second data parallel loop for the second operation is equivalent to the size of the data parallel loop for the operation;

based on determining that the size of the second data parallel loop is not equivalent to the size of the data parallel loop, applying the one or more regression models to predict a first performance number for the second operation, when executed by the central processing unit, and second performance number for the second operation, when executed by the graphics processing unit;

selecting, from the first performance number and the second performance number, a faster performance number; and executing the second operation with a device associated with the faster performance number to execute the second operation more quickly, than without the faster performance number, wherein the device is selected from the group consisting of: the central processing unit and the graphics processing unit.

11. The computer program product of claim 10, wherein online profiling the two versions of the data parallel loop for the operation by asynchronously executing the first version of the two versions of the data parallel loop for the operation, in a profile mode, with the graphics processing unit and executing the second version of the two versions of the data parallel loop for the operation, in the profile mode, with the central processing unit, comprises:

executing, by the one or more processors, the first version of the two versions of the data parallel loop for the operation with the graphics processing unit in the profile mode, comprising:

allocating memory of the graphics processing unit;

launching a graphics unit processing kernel to execute the first version of the two versions of the data parallel loop for the operation, wherein the launching comprises:

populating the kernel with start and stop events;

adding a callback to be called on the host after the kernel execution is complete; and executing the first version of the two versions of the data parallel loop for the operation with the kernel.

12. The computer program product of claim 11, wherein generating the execution time for the first version of the two versions of the data parallel loop for the operation comprises:

executing the callback, wherein the executing enqueues a kernel identifier for the kernel and the start and stop events into a graphics processing unit queue; and obtaining, by the one or more processors, the kernel identifier and the start and stop events from the graphics processing unit queue, wherein the kernel identifier and the start and stop events comprise a portion of execution time and the performance data for the operation when executed by the graphics processing unit.

13. The computer program product of claim 11, wherein the start and stop events and the callback prevent the kernel from blocking the host.

14. A host computing system comprising:

a memory;

one or more processors in communication with the memory;

program instructions executable by the one or more processors via the memory to perform a method, the method comprising:

obtaining, by the one or more processors, during runtime, from a compiler, two versions of a data parallel loop for an operation, wherein a first version of the two versions is for execution of the operation with a graphics processing unit and a second version of the two versions is utilized to execute the operation with a central processing unit, where the host computing system comprises the central processing unit and the graphics processing unit is accessible to the host;

online profiling the two versions by asynchronously executing the first version, in a profile mode, with the graphics processing unit and executing the second version, in the profile mode, with the central processing unit;

generating, based on the online profiling, by the one or more processors, execution times for the first version and the second version to determine whether to utilize the graphics processing unit or the central processing unit to execute the operation more quickly;

storing, by the one or more processors, the executions times and performance data from the online profile in a storage, wherein the performance data comprises a size of the data parallel loop for the operation;

updating, by the one or more processors, one or more regression models to predict performance numbers for a process of an unknown loop size;

executing the operation by the central processing unit or the graphics processing unit based on the performance data;

obtaining, by one or more processors, during runtime, from the compiler, two versions of a second data parallel loop for a second operation;

determining, by the one or more processors, based on accessing the storage, if a size of the second data parallel loop for the second operation is equivalent to the size of the data parallel loop for the operation;

based on determining that the size of the second data parallel loop is not equivalent to the size of the data parallel loop, applying the one or more regression models to predict a first performance number for the second operation, when executed by the central processing unit, and second performance number for the second operation, when executed by the graphics processing unit;

selecting, from the first performance number and the second performance number, a faster performance number; and executing the second operation with a device associated with the faster performance number to execute the second operation more quickly than without the faster performance number, wherein the device is selected from the group consisting of: the central processing unit and the graphics processing unit.

* * * * *